(12) United States Patent
Klein et al.

(10) Patent No.: US 11,387,709 B2
(45) Date of Patent: Jul. 12, 2022

(54) COOLING MODULE WITH AXIAL FAN AND FLOW DEFLECTION REGION FOR VEHICLES

(71) Applicant: Hanon Systems, Daejeon (KR)

(72) Inventors: Torsten Klein, Troisdorf (DE); Susanne Reimche-Nuding, Cologne (DE); Ján Greguš Kollár, Skalica (SK)

(73) Assignee: HANON SYSTEMS, Daejeon (KR)

( * ) Notice: Subject to any disclaimer, the term of this patent is extended or adjusted under 35 U.S.C. 154(b) by 440 days.

(21) Appl. No.: 16/502,156

(22) Filed: Jul. 3, 2019

(65) Prior Publication Data

US 2020/0014282 A1     Jan. 9, 2020

(30) Foreign Application Priority Data

Jul. 6, 2018 (DE) .......................... 102018116407.6
Feb. 13, 2019 (DE) .......................... 102019103541.4

(51) Int. Cl.
    *H02K 9/18*      (2006.01)
    *H02K 7/00*      (2006.01)
    (Continued)

(52) U.S. Cl.
CPC .................. *H02K 9/18* (2013.01); *B60K 1/00* (2013.01); *B60K 11/06* (2013.01); *F04D 25/08* (2013.01);
(Continued)

(58) Field of Classification Search
CPC .. H02K 9/18; H02K 9/02; H02K 5/18; H02K 5/24; H02K 5/20; H02K 7/006;
(Continued)

(56) References Cited

U.S. PATENT DOCUMENTS 4,111,275 A * 9/1978 Masuda ............... B60H 1/3227
                                                           180/68.1
5,363,002 A * 11/1994 Hernden ............... H02K 5/203
                                                            310/58

(Continued)

FOREIGN PATENT DOCUMENTS

| CN | 102407835 A | 4/2012 |
| JP | 2002225573 A | 8/2002 |
| JP | 2003098600 A | 4/2003 |

*Primary Examiner* — Maged M Almawri
(74) *Attorney, Agent, or Firm* — Shumaker, Loop & Kendrick, LLP; James D. Miller

(57) ABSTRACT

The invention relates to a cooling module including an axial fan for vehicles, in particular for electric vehicles, which is characterized in that a cooling module casing encloses the axial fan and a flow deflection region and a cooling airflow enters the cooling module through an intake plane and leaves the cooling module through an outflow plane, wherein the intake plane and the outflow plane are aligned at an angle alpha in relation to one another and the angle alpha as the inclination of the intake plane in relation to the outflow plane is formed greater than or equal to 55° and the cooling module casing has a rear wall, wherein the rear wall is arranged at an angle beta of at most 90° in relation to the outflow plane, so that a flow deflection region is formed in the cooling module casing between the intake plane and the outflow plane and the rear wall.

10 Claims, 6 Drawing Sheets

Figure 1:
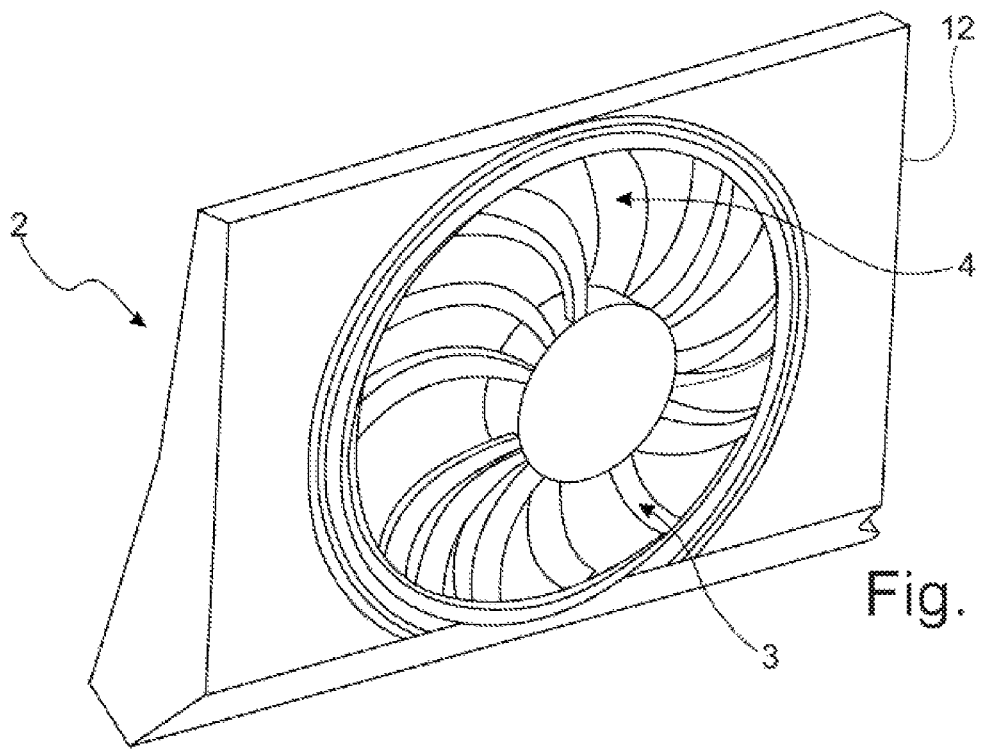

(51) Int. Cl.
  *H02K 5/18* (2006.01)
  *B60K 1/00* (2006.01)
  *H02K 5/24* (2006.01)
  *B60K 11/06* (2006.01)
  *F04D 25/08* (2006.01)
  *H02K 9/04* (2006.01)
  *F01P 5/06* (2006.01)
  *F04D 19/00* (2006.01)
  *F04D 29/54* (2006.01)

(52) U.S. Cl.
  CPC ............... *H02K 5/18* (2013.01); *H02K 5/24* (2013.01); *H02K 7/006* (2013.01); *H02K 9/04* (2013.01); *B60K 2001/003* (2013.01); *B60K 2001/006* (2013.01); *B60Y 2200/91* (2013.01); *F01P 5/06* (2013.01); *F04D 19/002* (2013.01); *F04D 29/544* (2013.01); *H02K 2213/03* (2013.01); *H02K 2213/12* (2013.01)

(58) Field of Classification Search
  CPC .. H02K 2213/12; H02K 2213/03; B60K 1/00; B60K 2001/006; B60K 11/06; F01P 5/06; F04D 19/002; F04D 25/08
  USPC ..... 310/51, 58, 59, 62; 180/68.1–68.4, 68.6, 180/65.1; 165/41, 42
  See application file for complete search history.

(56) References Cited

U.S. PATENT DOCUMENTS

| | | | | |
|---|---|---|---|---|
| 6,045,327 | A * | 4/2000 | Amr | F04D 25/08 416/189 |
| 6,497,489 | B1 * | 12/2002 | Li | G03B 21/18 353/57 |
| 6,827,547 | B2 | 12/2004 | Robb | |
| 6,832,837 | B2 * | 12/2004 | Suzuki | G03B 21/16 349/8 |
| 7,896,503 | B2 * | 3/2011 | Woo | G03B 21/16 348/748 |
| 7,988,303 | B2 * | 8/2011 | Noda | G03B 21/16 353/61 |
| 8,474,557 | B2 * | 7/2013 | Wolf | B60T 5/00 180/68.1 |
| 8,584,595 | B2 * | 11/2013 | Koyama | F04D 27/004 105/34.1 |
| 8,596,797 | B2 * | 12/2013 | Onodera | H01J 61/526 353/57 |
| 8,866,353 | B2 * | 10/2014 | Miyama | H02K 5/18 310/58 |
| 9,041,260 | B2 * | 5/2015 | Ramey | H02K 9/19 310/58 |
| 9,559,569 | B2 * | 1/2017 | Huang | H02K 9/227 |
| 9,952,487 | B2 * | 4/2018 | Lin | G03B 21/145 |
| 10,601,283 | B2 * | 3/2020 | Na | H02K 5/207 |
| 10,608,505 | B1 * | 3/2020 | Long | H02K 15/14 |
| 10,833,563 | B1 * | 11/2020 | Stockton | H02K 9/18 |
| 11,159,072 | B2 * | 10/2021 | Ruck | H02K 5/207 |
| 11,159,074 | B1 * | 10/2021 | Long | B64D 33/08 |
| 2002/0015640 | A1 * | 2/2002 | Nishiyama | F01P 11/12 415/119 |
| 2002/0017823 | A1 * | 2/2002 | Asao | H02K 3/24 310/58 |
| 2002/0096946 | A1 * | 7/2002 | Bisschops | H02K 3/24 310/58 |
| 2002/0145342 | A1 * | 10/2002 | Riess | H02K 9/19 310/58 |
| 2003/0026699 | A1 * | 2/2003 | Stairs | F04D 29/582 416/192 |
| 2003/0042805 | A1 * | 3/2003 | Bates | H02K 5/24 310/58 |
| 2003/0042806 | A1 * | 3/2003 | Inaba | H02K 5/20 310/58 |
| 2003/0080636 | A1 * | 5/2003 | Boardman | H02K 9/18 310/58 |
| 2003/0111918 | A1 * | 6/2003 | Nishikawa | H02K 5/20 310/58 |
| 2003/0137200 | A1 * | 7/2003 | Linden | H02K 5/203 310/59 |
| 2003/0183446 | A1 * | 10/2003 | Shah | F15D 1/02 181/205 |
| 2006/0125240 | A1 * | 6/2006 | Kato | H02K 9/06 290/46 |
| 2007/0069593 | A1 * | 3/2007 | Vasilescu | H02K 11/048 310/156.56 |
| 2008/0106159 | A1 * | 5/2008 | Yoshida | H02K 9/22 310/64 |
| 2009/0057043 | A1 * | 3/2009 | Robinson | F04D 29/362 180/68.1 |
| 2010/0270419 | A1 * | 10/2010 | Yoeli | B64C 27/20 244/209 |
| 2011/0073288 | A1 * | 3/2011 | Hirukawa | B60K 11/08 165/104.34 |
| 2011/0101802 | A1 * | 5/2011 | Hennings | H02K 5/20 310/58 |
| 2011/0298316 | A1 * | 12/2011 | Bradfield | H02K 5/203 310/58 |
| 2011/0298317 | A1 * | 12/2011 | Bradfield | H02K 9/19 310/58 |
| 2012/0019084 | A1 * | 1/2012 | Tsuge | H02K 9/06 310/59 |
| 2012/0111652 | A1 * | 5/2012 | Charnesky | F01P 7/10 180/68.1 |
| 2013/0062974 | A1 * | 3/2013 | Chamberlin | H02K 5/20 310/59 |
| 2014/0175914 | A1 * | 6/2014 | Zeng | H02K 5/20 310/51 |
| 2014/0225473 | A1 * | 8/2014 | Uchiyama | H01L 35/02 310/306 |
| 2014/0265664 | A1 * | 9/2014 | Camilleri | H02K 15/14 310/59 |
| 2014/0354095 | A1 * | 12/2014 | Ishikawa | H02K 9/06 310/71 |
| 2016/0079824 | A1 * | 3/2016 | McKinzie | H02K 9/227 310/58 |
| 2016/0104658 | A1 * | 4/2016 | Bradfield | H02K 9/06 257/713 |
| 2017/0170707 | A1 * | 6/2017 | Takagi | H02K 7/006 |
| 2017/0181332 | A1 * | 6/2017 | Schmitt | H02K 5/20 |
| 2019/0294180 | A1 * | 9/2019 | Reinhart | G05D 1/0295 |
| 2020/0153291 | A1 * | 5/2020 | Van Der Wal | H02K 7/006 |

\* cited by examiner

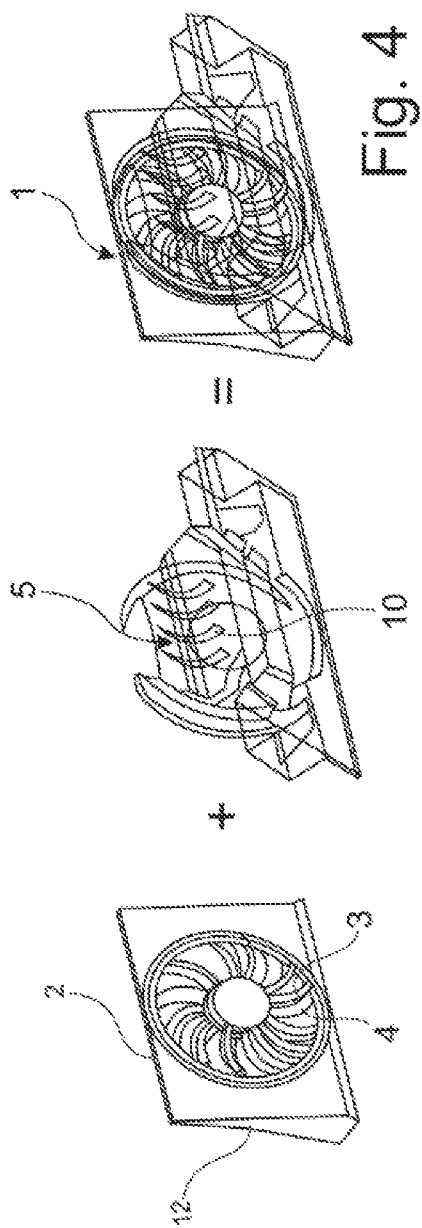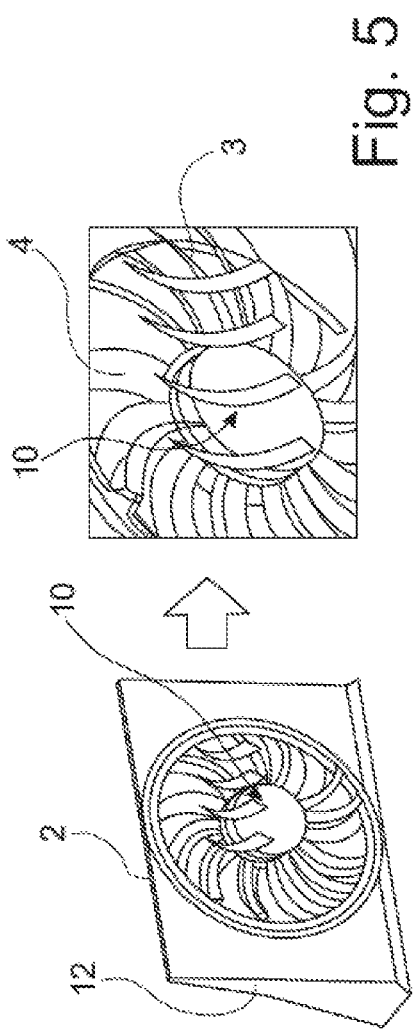

COOLING MODULE WITH AXIAL FAN AND FLOW DEFLECTION REGION FOR VEHICLES

CROSS-REFERENCE TO RELATED PATENT APPLICATIONS

This patent application claims the benefit of German Patent Application No. DE 10 2019 103 541.4 filed Feb. 13, 2019 and German Patent Application No. DE 10 2018 116 407.6 filed Jul. 6, 2018, the entire disclosures of which are hereby incorporated herein by reference.

FIELD

The invention relates to a cooling module comprising an axial fan for vehicles, in particular for electric vehicles.

The field of application of the invention is preferably in the field of cooling electric vehicles, which have to be cooled using a cooling module having a modified design in comparison to internal combustion engines.

BACKGROUND

An engine cooling fan for an internal combustion engine having an improved flow characteristic is disclosed in US 2004/0146400 A1. The cooling module consists of a stator and a diffuser, which is arranged between the fan and the engine. The stator increases the static pressure on the axial fan while reducing the rotation component of the conveyed air. Such cooling modules of internal combustion engines manage without a cooling module casing, since the cooled engines are more robust in comparison to electric motors with respect to moisture compatibility.

Generic cooling modules for electric vehicles have an axial fan for cooling the electromotive drive, the batteries and/or accumulators, and for operating the air-conditioning system for the passenger compartment. The cooling module, in contrast to designs according to the prior art for internal combustion engines, is enclosed by a cooling module casing, so that the cooling air, which possibly has increased moisture content or can contain water drops, cannot come into contact in an uncontrolled manner with the electric drive system or the battery system, since moisture can have negative effects on the mentioned systems.

For cooling modules of drive systems of electric vehicles, the cooling module casing results in a higher pressure loss. Adopting axial fans of internal combustion engines can have the result that the air volume is not reached because of the increased counter pressure in the cooling of electric vehicles and therefore cooling cannot be carried out adequately.

One problem in electric vehicles is therefore that the standard drivetrain cooling modules of internal combustion engine vehicles cannot meet the volume requirements for solely electric vehicles. This is because, on the one hand, the temperature differences in the cooling liquid are less than in conventional internal combustion engines, since the waste heat temperature level is significantly below the level of internal combustion engines. It is therefore difficult to transfer the heat to the ambient air.

Furthermore, the drivetrain cooling module in electric vehicles, as already described above, is enclosed by a closed housing, which conducts the air from the inlet to the outlet.

This housing represents a further increase of the pressure drop in comparison to conventional cooling modules for internal combustion engines, which do not have such a housing. The cooling module housing is required, however, since the cooling air is possibly loaded with moisture and water droplets and the cooling airflow cannot come into contact with electrical devices.

The demand for increased cooling air volume due to the lower temperature difference and the increased pressure loss due to the casing of the cooling module results in the required design modification of the fan module, so that the conventional modules of internal combustion engines cannot be readily used. It is therefore necessary to modify the component design, in particular for electric automobiles, to completely fulfill the functionality of the cooling.

SUMMARY

The object of the invention is to provide a cooling module comprising an axial fan, which enables an improved through flow of the cooling airflow with reduced pressure loss and oriented airflow, which rotates as little as possible.

The object is achieved by a subject matter having the features according to claim 1. Refinements are specified in the dependent claims.

The invention is achieved in particular by a cooling module comprising an axial fan for vehicles, in particular for electric vehicles, which has a cooling module casing, which encloses the axial fan and a flow deflection region. The cooling airflow enters the cooling module through an intake plane and leaves the cooling module through an outflow plane. The intake plane and outflow plane are aligned at an angle alpha in relation to one another, wherein the angle alpha is greater than or equal to 55°. A flow deflection region is formed in the cooling module casing between the intake plane and the outflow plane, wherein the cooling module casing has a rear wall. The rear wall is arranged at an angle beta of at most 90° in relation to the outflow plane, so that the flow deflection region is formed inside the cooling module casing between the intake plane, the outflow plane, and the rear wall. In lateral section, the flow region forms a triangle, which is formed from intake plane, outflow plane, and rear wall.

Furthermore, at least one housing stator is advantageously designed as an air guiding element as a part of the cooling module casing and is arranged in the flow deflection region. The housing stator is oriented inward into the flow deflection region in relation to the cooling module casing in this case and is formed ribbed. The housing stator interacts with the axial fan and promotes the deflection of the cooling airflow within the flow deflection region. The housing stator orients the cooling airflow toward the outflow plane in the perpendicular direction in relation thereto, so that the cooling airflow leaves the cooling module perpendicularly in relation to the outflow.

The housing stator is preferably formed in a three-dimensional curve, wherein the housing stator has a housing stator beginning and housing stator end, at the respective ends, wherein the housing stator beginning is aligned in the direction of the tangent of the housing stator intake airflow direction. The housing stator end is aligned perpendicularly to the outflow plane of the cooling module. The housing stator inlet airflow direction corresponds in this case to the spin-affected airflow direction at the axial fan outlet. The airflow after the axial fan outlet is conducted into the flow deflection region of the cooling module casing and is incident there on at least one and preferably multiple housing stators, which conduct the airflow downward.

In one particularly preferred embodiment of the invention, the housing stator is arranged facing downward in the cooling module casing as a three-dimensional strip in the form of a circular arc segment.

One advantageous embodiment furthermore consists of forming the housing stator as a rib of the cooling module casing. The embodiment of the housing stator as a rib has the effect of increasing the mechanical strength of the cooling module casing, in addition to the fluidic improvements. Susceptibility of the casing to vibrations and the associated undesired noise development therefore also decrease.

Multiple housing stators are advantageously formed as part of the casing, wherein each housing stator has a curvature and length corresponding to its location in such a way that the cooling airflow is aligned perpendicularly in relation to the outflow plane. This follows the concept that the housing stators distributed in the projection over the upper circumference of the fan wheel each have a different location and alignment of the housing stator beginning. The respective housing stator end, in contrast, always has the same direction, namely preferably perpendicular to the direction of the outflow plane.

The formation of multiple housing stators parallel to each other in relation to the housing stator end in the region of the rear wall of the cooling module casing is thus particularly advantageous. The housing stator ends are thus oriented downward like a comb and conduct the cooling airflow downward toward the outflow plane. At the same time, the rotation of the cooling airflow is thus reduced or suppressed, respectively.

In addition to the housing stators of the cooling module casing, the axial fan itself is preferably also formed with stator vanes as part of the mounting of the axial fan. The combination of stator vanes on the fan wheel and additional housing stators downstream in the cooling airflow direction significantly improves the flow characteristic. Both the volume flow and also the directionality of the cooling airflow are enhanced or improved, respectively.

The angle beta is advantageously formed at 85°, so that the rear wall is arranged approximately perpendicularly in relation to the outflow plane.

The angle alpha as the inclination of the intake plane in relation to the outflow plane is particularly preferably formed at an angle of greater than or equal to 55°. The angle alpha is optimally formed at 90°, i.e., the module is vertical, which is usually not provided in a normal installation situation, however.

The cooling module casing is also advantageously formed in multiple parts depending on the embodiment of the mounting of the axial fan. This is advantageous in cases in which the mounting of the axial fan already assumes the function of the casing for the axial fan and thus the flow deflection region is formed directly by the cooling module casing adjoining the axial fan.

The separate manufacturing of the stators and the positioning of the stators in the cooling module casing carried out during the assembly is advantageous with respect to manufacturing for a less complex mold for producing the cooling module casing.

The connection of the housing stators to the rear wall of the cooling module casing by clipping on and/or clipping in is particularly advantageous. The housing stators are thus even replaceable and are thus also adaptable, for example, to changed operating conditions due to a changed fan speed.

The housing stator preferably has a housing stator head with an approximately circular cross section, which merges into a housing stator neck. The housing stator head preferably has a radius of 10 mm and the housing stator neck has a thickness of 10 mm. Such a solid housing stator is less susceptible to a power drop than thin-walled embodiments. The housing stator head ensures an optimum tangential inflow of the air due to the circular configuration.

According to the concept of the invention, in a first step, the design of the fan wheel of the axial fan is maintained and only the stator, or the stator blades, respectively, in the cooling module casing are added. The stator blades act as a diffuser and can convert a part of the dynamic pressure of the air behind the axial fan into static pressure. Since the static pressure at the outlet of the module is the ambient pressure and the static pressure downstream of the guide blades of the axial fan is equal to the static ambient pressure, the static pressure immediately behind the fan wheel is lowered by the guide blades in comparison to a fan without guide blades.

If the static pressure is lowered behind the fan wheel, the fan with the guide blades can operate against a somewhat higher static pressure than a fan without guide blades can.

One problem is that stator blades are costly, since the mold for the casing of the module is more complex. Fan performance can be further improved by adding additional stator blades to the housing. According to one advantageous embodiment, the housing stator blades are used in the cooling module casing.

Multiple advantages may be achieved using the invention.

The additional housing stators on the cooling module casing in the flow deflection region, also called housing stator blades, reduce the rotation or the spin of the cooling airflow, decrease the counter pressure of the cooling module casing, and increase the cooling airflow.

The additional functionality may be integrated easily into the cooling module casing to be manufactured in injection molding, since it points in the molding direction in manufacturing and is thus relatively simple to implement.

The housing stator blades produce additional rigidity on the housing. The number of the ribs outside the housing can thus be reduced, which decreases the complexity of the mold and thus further reduces the costs.

The fan wheel of the axial fan and the cooling module casing display a very unfavorable inclination because of the specific installation location under real conditions, since the angle alpha is frequently less than 55°. The entire module is nonetheless very compact, since the rear wall is formed correspondingly inclined.

The advantages of the invention consist in summary of the pressure loss of the cooling module casing being reduced and the efficiency of the axial fan thus being enhanced. The improvement can be achieved without additional costs.

DRAWINGS

Figure 2:
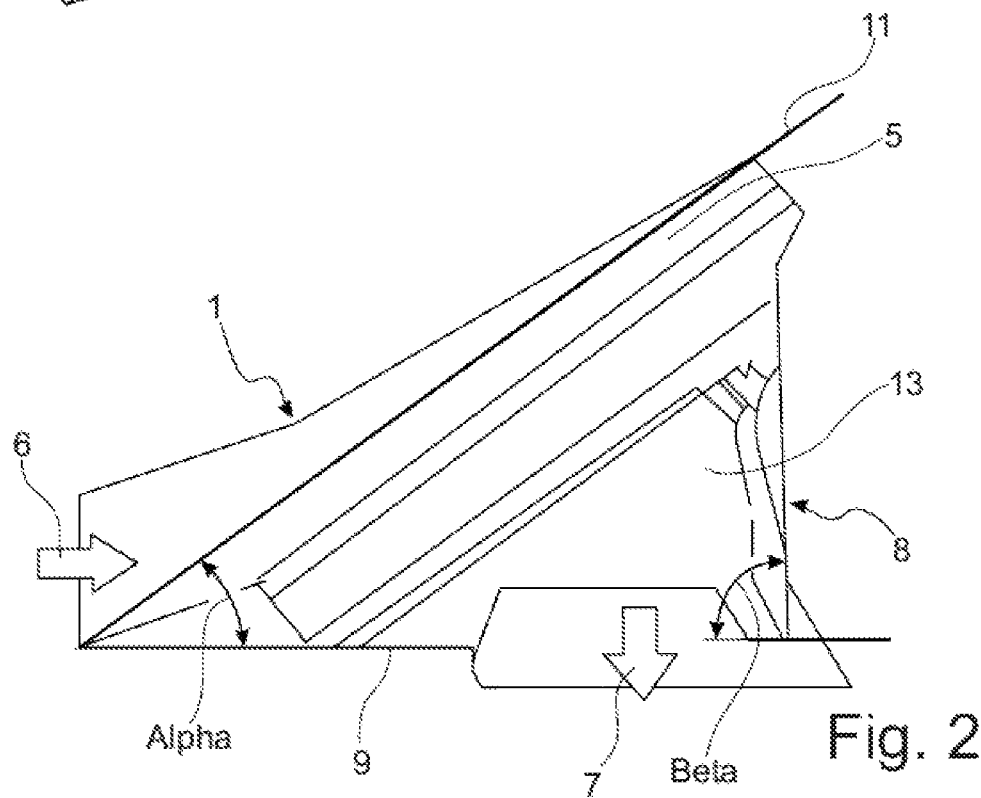
Figure 3:
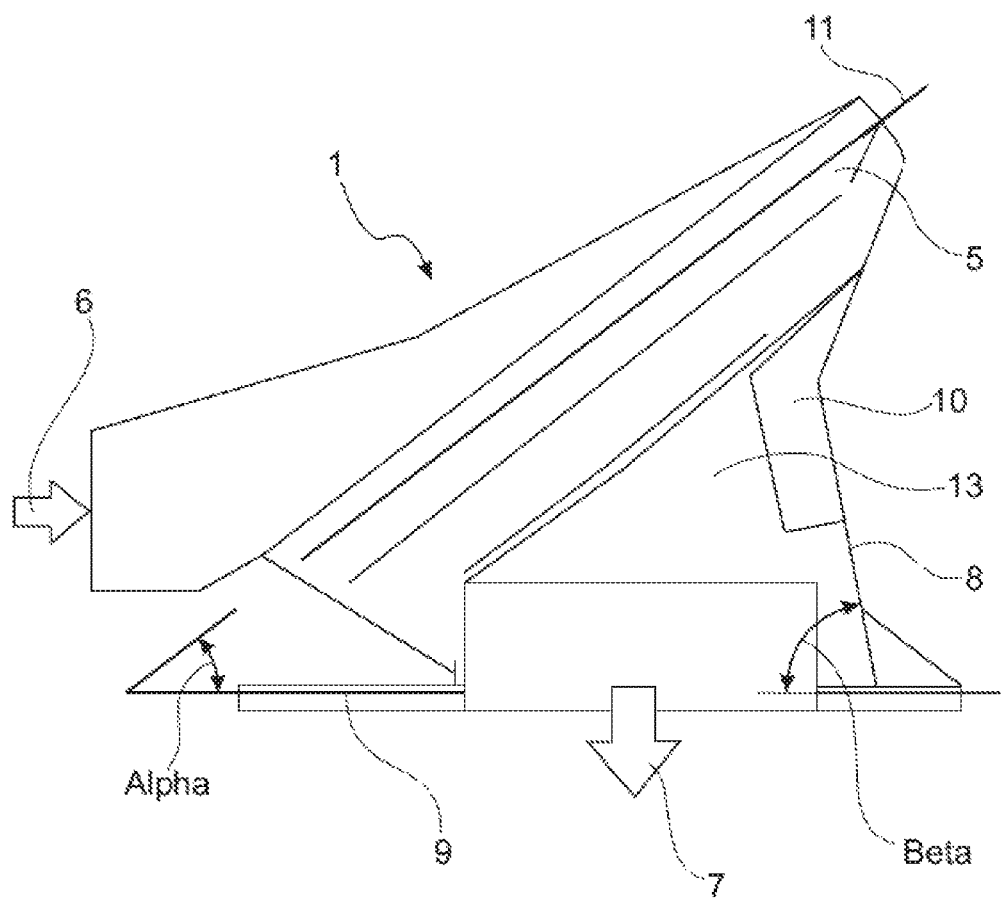
Figure 6:
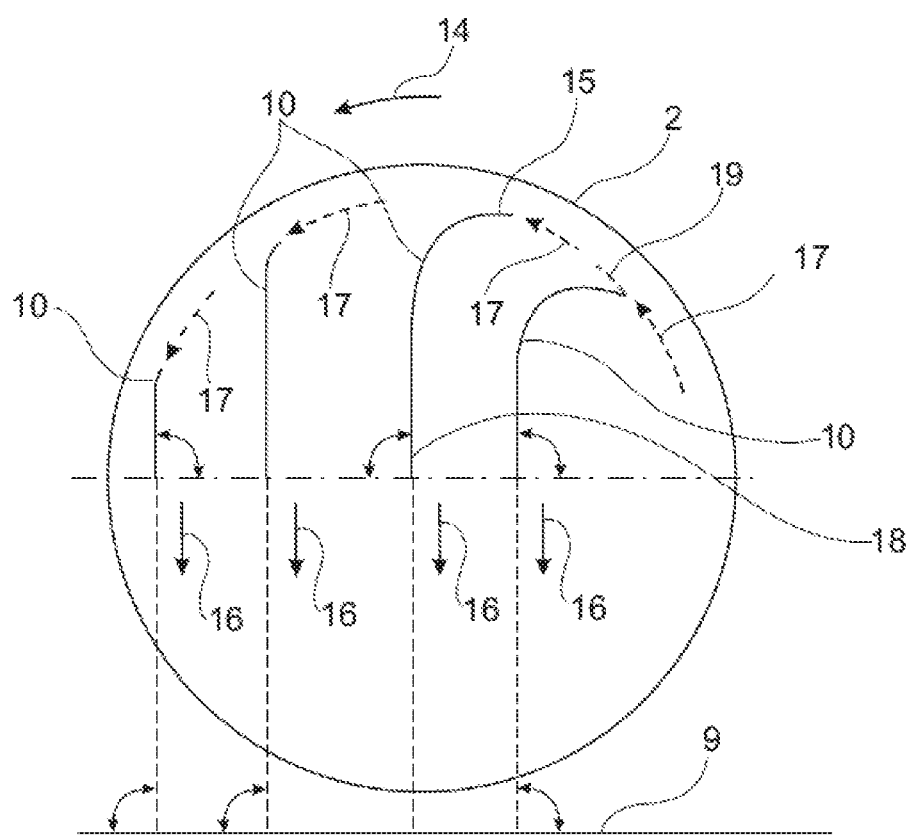
Figure 7A:
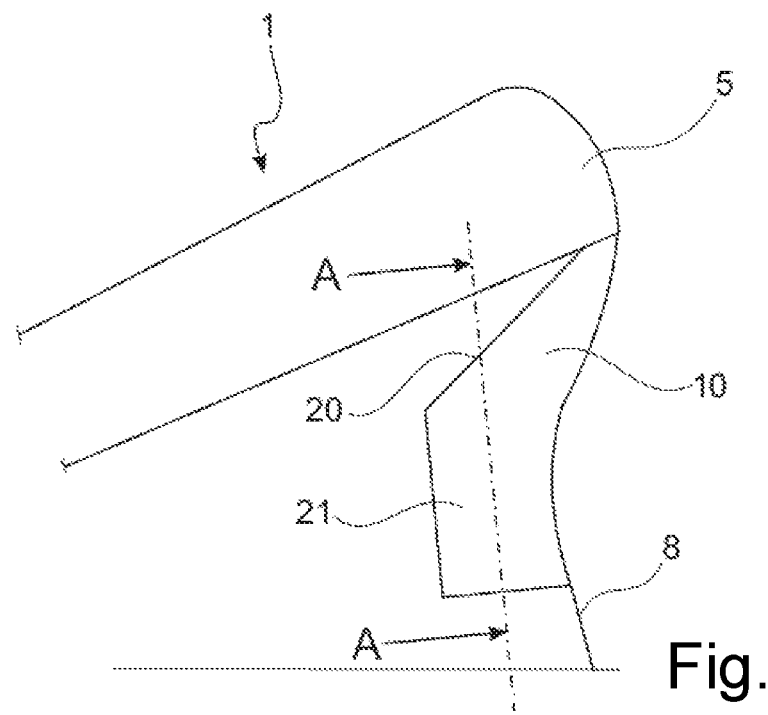
Figure 7B:
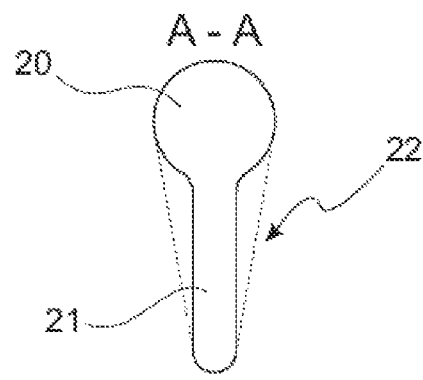
Figure 8A:
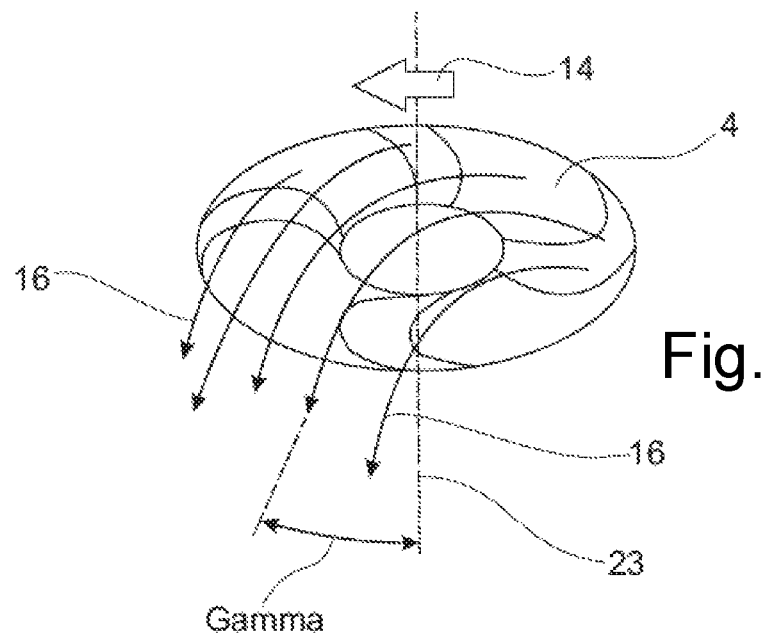
Figure 8B:
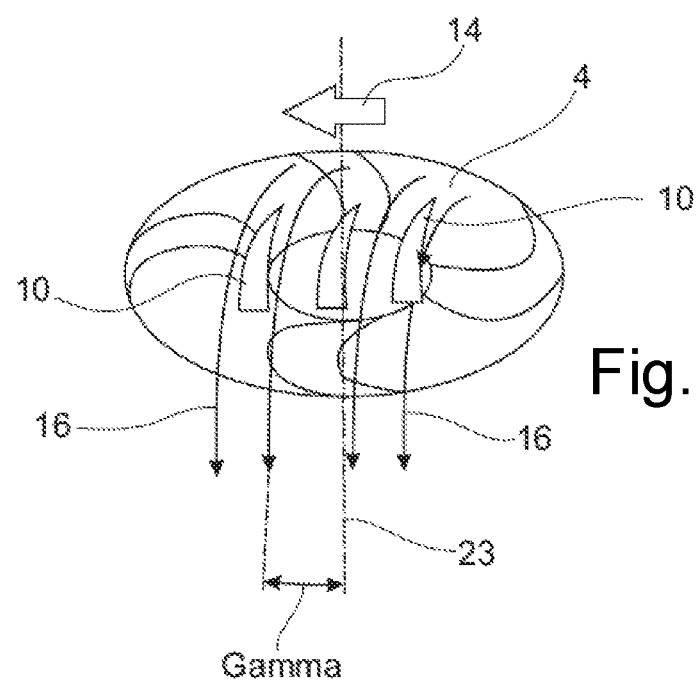

Further details, features, and advantages of embodiments of the invention result from the following description of exemplary embodiments with reference to the associated drawings. In the figures:

FIG. 1: shows an axial fan according to the prior art,

FIG. 2: shows a cooling module having a cooling module casing in a side view,

FIG. 3: shows a cooling module having a housing stator as part of the cooling module casing in a side view, FIG. 4: shows a cooling module having housing stators in a perspective view, FIG. 5: shows a detailed illustration of axial fan and housing stator, FIG. 6: shows a projection of the housing stators on the axial fan, FIG. 7A: shows a cooling module having housing stator and line of section, FIG. 7B: shows a housing stator cross section, FIG. 8A: shows a schematic diagram of the airflow direction without, and FIG. 8B: shows a schematic diagram of the airflow direction with housing stators.

DETAILED DESCRIPTION

FIG. 1 shows an axial fan 2 according to the prior art. The axial fan 2 has a fan wheel 4 and stator vanes 3, which are distributed on the outlet side around the circumference of the flow cross section, are arranged directly behind the fan wheel 4, and are formed corresponding to the vanes of the fan wheel 4. The axial fan 2 has a mounting 12, which mounts the motor for the fan wheel 4 and the stator vanes 3.

FIG. 2 shows a side view of cooling module 1 according to the invention, wherein the cooling module 1, in an adaptation to the application of the cooling module 1 for cooling of an electric drive of a vehicle, is housed using a cooling module casing 5. The encased axial fan, which is thus not shown, is inclined at an angle alpha, the inclination angle of the intake plane 11 in relation to the outflow plane 9. The cooling module casing 5 has a rear wall 8, which is arranged at an angle beta in relation to the outflow plane 9, wherein the angle beta is 85° and thus approximately 90°. The rear wall 8 is thus arranged approximately perpendicularly in relation to the outflow plane 9. The cooling airflow 6 enters the cooling module 1 according to the illustrated exemplary embodiment in the direction of the horizontal outflow plane 9, i.e., parallel thereto, and leaves the cooling module 1 orthogonally to the outflow plane 9 as the outlet volume flow 7. A deflection and an alignment of the cooling airflow 6 thus takes place inside the cooling module 1 before it leaves the cooling module 1 via the outflow plane 9 as the outlet volume flow 7. The flow deflection region 13 is therefore the region of the cooling module 1 which is delimited by the intake plane 11, the outflow plane 9, and the rear wall 8. The cooling airflow 6 experiences a first deflection from the horizontal entry into the cooling module casing 5 parallel to the outflow plane 9 to the entry into the axial fan 2 covered by the cooling module casing 5 in this illustration via the intake plane 11. From the axial fan 2, the cooling airflow 6 enters the flow deflection region 13, in which it is conducted in the direction of the outflow plane 9 and leaves the cooling module 1 as the outlet volume flow 7.

FIG. 3 shows a cooling module 1 according to the invention in a side view. Similarly to FIG. 2, the cooling module 1 is housed using a cooling module casing 5, wherein the cooling module casing 5 has flow conduction elements, which are formed as housing stators 10 as part of the cooling module casing 5. The housing stators 10 are formed on the rear wall 8 of the cooling module casing 5 and extend in a crescent shape into the space of the flow deflection region 13 spanned by the angle alpha between the intake plane 11 and the outflow plane 9 and enclosed by the cooling module casing 5. Similarly to the embodiment according to FIG. 2, the cooling airflow 6 enters the cooling module casing 5. The cooling airflow 6 flows in this case parallel to the outflow plane 9 at the entry into the cooling module casing 5 and is incident on the intake plane 11 of the axial fan 2 aligned at the angle alpha in relation to the outflow plane 9 and flows therein. The cooling airflow 6 is conveyed by the axial fan 2 of the cooling module 1 into the flow deflection region 13 of the cooling module casing 5, and due to the housing stators 10 in the flow deflection region 13, the airflow experiences a deflection and a dissipation of the spin which it has received from the axial fan 2.

The housing stators 10 thus result in the spin dissipation, the deflection, and the alignment of the airflow in the flow deflection region 13 of the cooling module 1. Deflected and directed at the outflow plane 9, the airflow then leaves the cooling module 1 as the outlet volume flow 7 through the outflow plane 9 and perpendicular thereto. The outlet volume flow 7 is thereafter ready for cooling tasks in the climate control and cooling system of the vehicle.

The basic concept of the invention having the combination of the components, from left to right, of axial fan 2 and cooling module 5 for the cooling module 1 is shown in perspective in FIG. 4. The fan wheel 4 with its mounting 12 are shown in the axial fan 2. The axial fan is advantageously supplemented by the stator vanes 3, which contribute to an improvement of the efficiency of the axial fan 2.

The component axial fan 2 is accommodated in the component cooling module casing 5. The housing stators 10 are made visible in the cooling module casing 5. Both components are brought together to form the cooling module 1. The housing stators 10 of the cooling module casing 5 fluidically supplement the fan wheel 2 having the fan wheel 4 and the stator vanes 3.

FIG. 5 shows the interaction and the positioning of the axial fan 2 of the cooling module 1 with the housing stators 10 of the cooling module casing 5. The housing stators 10 are aligned in the curvature thereof against the curvature of the vanes of the fan wheel 4 and also of the additionally provided stator vanes 3 of the axial fan 2. Multiple housing stators 10 are aligned parallel in relation to one another in the lower region and downward as flow conduction elements to the outflow plane 9 (not shown). In a particularly advantageous manner, the rotation or the spin of the cooling airflow 6 after the axial fan 2 is substantially suppressed by the housing stators 10 and the cooling airflow is oriented and strengthened in the direction of the outflow plane 9.

FIG. 6 shows an axial fan 2 from the viewpoint of the rear wall 8 upstream in the axial direction.

Four exposed housing stators 10, each individually curved in accordance with its location and designed so that the inflow can take place with the least possible impact losses, are shown in this case. This means that the housing stator inlet flow direction 17 has the same inclination as the tangent 19 on the housing stator beginning 15. This is shown in FIG. 6 on the right housing stator 10 by the depiction of the tangent 19 and the arrow for the housing stator inlet airflow direction 17 having the same direction.

The impact losses are minimized by the identical alignment of the housing stator beginning 15 and the air flowing out of the axial fan 2 with the housing stator inlet airflow direction 17. The fan wheel 4 (not shown) of the axial fan 2 has a rotational direction 14, which corresponds to the direction of the housing stator inlet airflow direction 17. The housing stator ends 18 are aligned so that a maximum pressure reclamation is achieved, which generally means that the housing stator ends 18 extend perpendicularly in relation to the outflow plane 9, indicated by dotted lines.

The housing stators 10 are preferably arranged in the upper half of the axial fan 2 along the outer circumference, but arrangements of the housing stators 10 in a specific angle range can also effectuate an advantageous improvement. A deflection of the airflow exiting from the axial fan 2 is performed by the housing stators 10, which airflow is accommodated with the housing stator inlet airflow direction 17 at the housing stator beginning 15 and flows along the housing stator 10 to the housing stator end 18. The airflow leaves the cooling module 1 perpendicularly to the outflow plane 9 there.

The spin-affected rotating flow of the air leaving the axial ventilator 2 is deflected in the flow deflection region 13 following in the flow direction by means of the housing stators 10 into an airflow oriented perpendicularly to the outflow plane 9 in the outlet airflow direction 16, before the air leaves the cooling module 1 as the outlet volume flow 7.

FIG. 7A schematically shows a detail of a cooling module 1. The cooling module casing 5 having the rear wall 8 and a housing stator 10 is shown. The housing stator 10 is provided with a line of section A-A. The housing stator cross section 22 along the line of section is shown in FIG. 7B. The housing stator cross section 22 has a housing stator head 20, which is formed approximately circular, at the upper end. The housing stator cross section 22 runs out into a housing stator neck 21, which shows the thickness of the housing stator below the upper edge or the peripheral region, respectively. The design of the housing stator neck 21 is shown in two alternative variants. According to one design having solid lines, the housing stator neck 21 is embodied having uniform thickness. Alternatively, the dotted line shows a design having decreasing thickness of the housing stator neck 21 beginning from the housing stator head 20. The radius of the housing stator head 20 is 10 mm according to the advantageous design of the invention shown. The enlarged radius improves the incident flow of the air and decreases the dependence on the optimum operating point of the cooling module 1. The attachment formed protrudes into the flow, wherein the housing stator head 20 has a greater thickness than the housing stator neck 21. At a thickness of the housing stators 10 of 10 mm, the susceptibility to a power drop is reduced.

The operating range of the module is expanded by the radius at the housing stator head 20, in that the impact losses at the housing stator head 20 are reduced in the case of incident flow angles which do not correspond to the design state, because the larger radius reduces the detachments around the housing stator head 20 in just these operating points. This typically reduces peak efficiency, but this is compensated for by the enlarged operating range.

The housing stators 10 are clipped onto the rear wall 8 as separate parts and can thus be adapted flexibly to the usage conditions and the parameters of the motor used, for example.

Alternatively, the housing stators 10 are integrated into the rear wall 8 of the cooling module casing 5 and are embodied in one piece jointly therewith as injection molded parts.

Schematic flow profiles of the air in the outlet airflow direction 16 are shown in FIG. 8A and FIG. 8B.

FIG. 8A shows the situation for the embodiment shown in FIG. 2 and FIG. 8B shows the situation for the embodiment of the cooling module 1 shown in FIG. 3.

The fan wheel 4 and its rotational direction 14 are shown in each of FIGS. 8A and 8B. The fan wheel axis 23 is indicated as a reference line in each case for the alignment of the outlet airflow direction 16.

In FIG. 8A, the outlet airflow direction 16 of the airflow flowing away from the fan wheel 4 is inclined at an angle gamma. The angle gamma is a measure in this case of achieving an optimum outflow direction of the airflow and denotes the deviation of the outlet airflow direction 16 from the orientation of the fan wheel axis 23, which, viewed in this projection from the rear wall of the cooling module casing into the flow deflection region, is perpendicular to the outflow plane. Since no additional flow guiding units are provided in the flow deflection region in the design according to FIG. 2, the resulting spin-affected displacement is between 15° to 25°. In FIG. 8B, additional flow guiding units are arranged in the flow deflection region according to the design shown in FIG. 3, which now additionally deflect and orient the spin-affected airflow exiting from the axial fan. Housing stators 10 are embodied and shown as the flow guiding units. The housing stators 10 deflect the airflow exiting from the fan wheel 4 in the direction of the fan wheel axis 23 and the angle gamma decreases to values between 2° and 6°. The outlet airflow direction 16 is thus approximately perpendicular to the outflow plane from this viewing direction, which means a significant improvement of the efficiency. The additional arrangement of housing stators 10 in the flow deflection region of the cooling module thus significantly improves the flow profile of the cooling air.

LIST OF REFERENCE SIGNS

1 cooling module
2 axial fan
3 stator vane
4 fan wheel
5 cooling module casing
6 cooling airflow
7 outlet volume flow
8 rear wall
9 outflow plane
10 housing stator
11 intake plane
12 mounting
13 flow deflection region
14 rotational direction
15 housing stator beginning
16 outlet airflow direction
17 housing stator inlet airflow direction
18 housing stator end
19 tangent
20 housing stator head
21 housing stator neck
22 housing stator cross section
23 fan wheel axis
alpha angle of inclination intake plane—outflow plane
beta angle outflow plane—rear wall
gamma outflow angle

What is claimed is:

1. A cooling module comprising an axial fan for vehicles, the cooling module comprising a cooling module casing enclosing the axial fan and a flow deflection region and a cooling airflow enters the cooling module through an intake plane and leaves the cooling module through an outflow plane, wherein the intake plane and the outflow plane are aligned at an angle alpha in relation to one another and the angle alpha as the inclination of the intake plane in relation to the outflow plane is formed greater than or equal to 55° and the cooling module casing has a rear wall, wherein the rear wall is arranged at an angle beta of at most 90° in relation to the outflow plane, so that a flow deflection region is formed in the cooling module casing between the intake plane and the outflow plane and the rear wall, wherein at least one housing stator is formed as an air guiding element as part of the cooling module casing and is arranged in the flow deflection region and is formed oriented into the flow deflection region and ribbed, wherein the housing stator has a housing stator beginning and a housing stator end, and wherein the housing stator beginning is formed in the direction of the tangent of the housing stator inlet flow direction and the housing stator end is formed perpendicular to the outflow plane, wherein multiple housing stators are formed having the housing stator ends parallel in relation to one another in the region of the rear wall of the cooling module casing.

2. The cooling module as claimed in claim 1, wherein each of the housing stators is formed as a rib of the cooling module casing.

3. The cooling module as claimed in claim 2, wherein the multiple housing stators are formed as part of the cooling module casing, wherein each of the housing stators has a curvature and a length corresponding to its location in such a way that the cooling airflow is aligned perpendicularly in relation to the outflow plane.

4. The cooling module as claimed in claim 1, wherein the axial fan is additionally formed comprising stator vanes as part of a mounting of the axial fan.

5. The cooling module as claimed in claim 1, wherein the angle beta is formed at 85°.

6. The cooling module as claimed in claim 1, wherein the cooling module casing is formed in multiple parts.

7. The cooling module as claimed in claim 1, wherein each of the housing stators has a housing stator head having a radius of 10 mm.

8. The cooling module as claimed in claim 1, wherein each of the housing stators has a housing stator neck having a thickness of 10 mm.

9. The cooling module as claimed in claim 1, wherein each of the housing stators is separately manufactured and is formed insertable into the cooling module casing.

10. The cooling module as claimed in claim 9, wherein the each of the housing stators can be clipped into the cooling module casing.

\* \* \* \* \*